(12) United States Patent
Riley et al.

(10) Patent No.: US 10,324,539 B2
(45) Date of Patent: Jun. 18, 2019

(54) MODULAR WEARABLE COMPONENTS

(71) Applicant: Microsoft Technology Licensing, LLC, Redmond, WA (US)

(72) Inventors: Raymond W. Riley, Bainbridge, WA (US); Simon C. Dearsley, Bellevue, WA (US); Emron J. Henry, Kirkland, WA (US); Kaitlyn M. Schoeck, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/469,289

(22) Filed: Mar. 24, 2017

(65) Prior Publication Data
US 2018/0059810 A1   Mar. 1, 2018

Related U.S. Application Data

(60) Provisional application No. 62/382,647, filed on Sep. 1, 2016.

(51) Int. Cl.
    *G06F 1/16*      (2006.01)
    *G06F 3/0346*   (2013.01)
    *G06F 3/0488*   (2013.01)
    *G06F 3/01*      (2006.01)

(52) U.S. Cl.
    CPC ............. *G06F 3/0346* (2013.01); *G06F 1/163* (2013.01); *G06F 3/015* (2013.01); *G06F 3/0488* (2013.01); *G06F 3/04883* (2013.01)

(58) Field of Classification Search
    CPC ........... G06F 1/203; G06F 2203/04103; G06F 3/041; G06F 3/0346
    See application file for complete search history.

(56) References Cited

U.S. PATENT DOCUMENTS

| | | | |
|---|---|---|---|
| 7,618,260 B2 | 11/2009 | Daniel et al. | |
| 8,576,073 B2 | 11/2013 | Mooring et al. | |
| 2001/0043514 A1* | 11/2001 | Kita | A44C 5/0015 368/281 |
| 2003/0071791 A1* | 4/2003 | Hanson | G06F 1/1601 345/169 |

(Continued)

FOREIGN PATENT DOCUMENTS

| | | |
|---|---|---|
| CN | 204166295 U | 2/2015 |
| WO | 9832057 A1 | 7/1998 |

(Continued)

OTHER PUBLICATIONS

Starr, Michelle, "Blocks: A customisable, modular smartwatch", Published on: Jul. 20, 2015 Available at: http://www.cnet.com/news/blocks-a-customisable-modular-smartwatch/.

(Continued)

*Primary Examiner* — Olga V Merkoulova
(74) *Attorney, Agent, or Firm* — Arent Fox LLP

(57) ABSTRACT

Aspects described herein generally relate to a modular device core that includes an interface for obtaining one or more signals based on attaching the modular device core to a mounting housing or a display module. A processor of the modular device core can be configured to modify one or more parameters for operating the modular device core based on the one or more signals.

20 Claims, 13 Drawing Sheets

(56) References Cited

U.S. PATENT DOCUMENTS

| | | | |
|---|---|---|---|
| 2006/0099995 A1* | 5/2006 | Kim | H04M 1/0214 |
| | | | 455/566 |
| 2014/0031081 A1* | 1/2014 | Vossoughi | H04M 1/0254 |
| | | | 455/556.1 |
| 2014/0084033 A1 | 3/2014 | Kellond et al. | |
| 2014/0239065 A1* | 8/2014 | Zhou | G06F 1/163 |
| | | | 235/380 |
| 2014/0295918 A1 | 10/2014 | Grifoni et al. | |
| 2015/0222742 A1 | 8/2015 | Son et al. | |
| 2015/0301606 A1 | 10/2015 | Andrei | |
| 2016/0094259 A1 | 3/2016 | Hatanaka et al. | |

FOREIGN PATENT DOCUMENTS

| | | |
|---|---|---|
| WO | 0038393 A2 | 6/2000 |
| WO | 2015116196 A1 | 8/2015 |

OTHER PUBLICATIONS https://www.chooseblocks.com/discover/overview.

* cited by examiner

MODULAR WEARABLE COMPONENTS

CLAIM OF PRIORITY UNDER 35 U.S.C. § 119

The present Application for Patent claims priority to Provisional Application No. 62/382,647, entitled "MODULAR WEARABLE COMPONENTS" filed Sep. 1, 2016, which is assigned to the assignee hereof and hereby expressly incorporated by reference herein for all purposes.

BACKGROUND

Use of computing devices is becoming more ubiquitous by the day. Computing devices range from standard desktop computers to wearable computing technology and beyond. The field of wearable devices has grown in recent years with the introduction of fitness bands and smart watches, some of which can interface with a nearby mobile device via short range communication technology (e.g., Bluetooth) to provide information thereto and/or to obtain and display information therefrom for consumption by a user wearing the fitness band or smart watch. These types of wearable computing technology range in functionality from fitness-type devices that display information relevant to fitness, such as step-tracking information, heart rate (e.g., via an integrated heart rate monitor/pulse detector and/or by interfacing with a separate heart rate monitor), distance, etc., to watches that are essentially mobile devices, or extensions of mobile devices, which can execute mobile applications for more robust processing/display of information. As such, wearable computing technology is becoming more and more complicated, and hence more and more expensive, in an attempt to be all things for all people.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device is provided that includes a modular device core. The modular device core includes a core retainer, a processor mounted in the core retainer, an attachment interface included in the core retainer, wherein the attachment interface is configured to releasably attach the core retainer to at least one of a mounting housing or a display module, a communication interface mounted in the core retainer and in electrical communication with the processor, where the communication interface is configured to obtain one or more signals based on attaching the core retainer to at least one of the mounting housing or the display module. The device also includes a display attached to at least one of the core retainer or the display module. The processor is configured to modify one or more parameters for operating the modular device core based on the one or more signals, where at least one of the one or more parameters relate to a layout of a graphical interface displayed on the display.

In another example, a device is provided that includes a housing having an attachment interface configured to releasably fix to a modular device core, and a communication interface for providing one or more signals to the modular device core based on attaching the modular device core to the mounting housing. The one or more signals can include one or more parameters for operating the modular device core based on the one or more signals, where at least one of the one or more parameters relate to a layout of a graphical interface to be displayed on a display of the modular device core.

In another example, a method for operating a modular device core is provided. The method includes detecting, by a processor, one or more signals received at an interface based on mounting the modular device core to at least one of a mounting housing or a display module, and modifying one or more parameters for operating the modular device core based at least in part on the one or more signals. The one or more parameters relate to a layout of data fields on a graphical interface displayed on a display based at least in part on the one or more signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various aspects related to a modular wearable device, such as a smart watch, a fitness band, a global positioning system (GPS) device, or any other wearable device, having one or more functions that can be modified based on mounting of a modular device core within a mounting housing of the modular wearable device. For example, the mounting housing may include a wrist band or strap, a lanyard, a necklace, or other accessory that includes a mounting area for receiving and holding the modular device core. In one example, the modular wearable device may modify a user interface displayed on a display of the modular device core based at least in part on at least one of: one or more features of the mounting housing, or a detected orientation of the modular device core within the mounting housing, etc. In another example, the mounting housing may provide one or more additional functions for use by the modular device core when the modular device core is affixed to the mounting housing. For instance, such one or more additional functions may include, but are not limited to, functions such as an additional power source, a location device (e.g., GPS device), a step-tracking device, a power meter device, a heart rate or pulse tracking device, an angle or orientation sensor, an interface to one or more additional devices (e.g., fitness devices at a gym), etc.).

Figure 1:
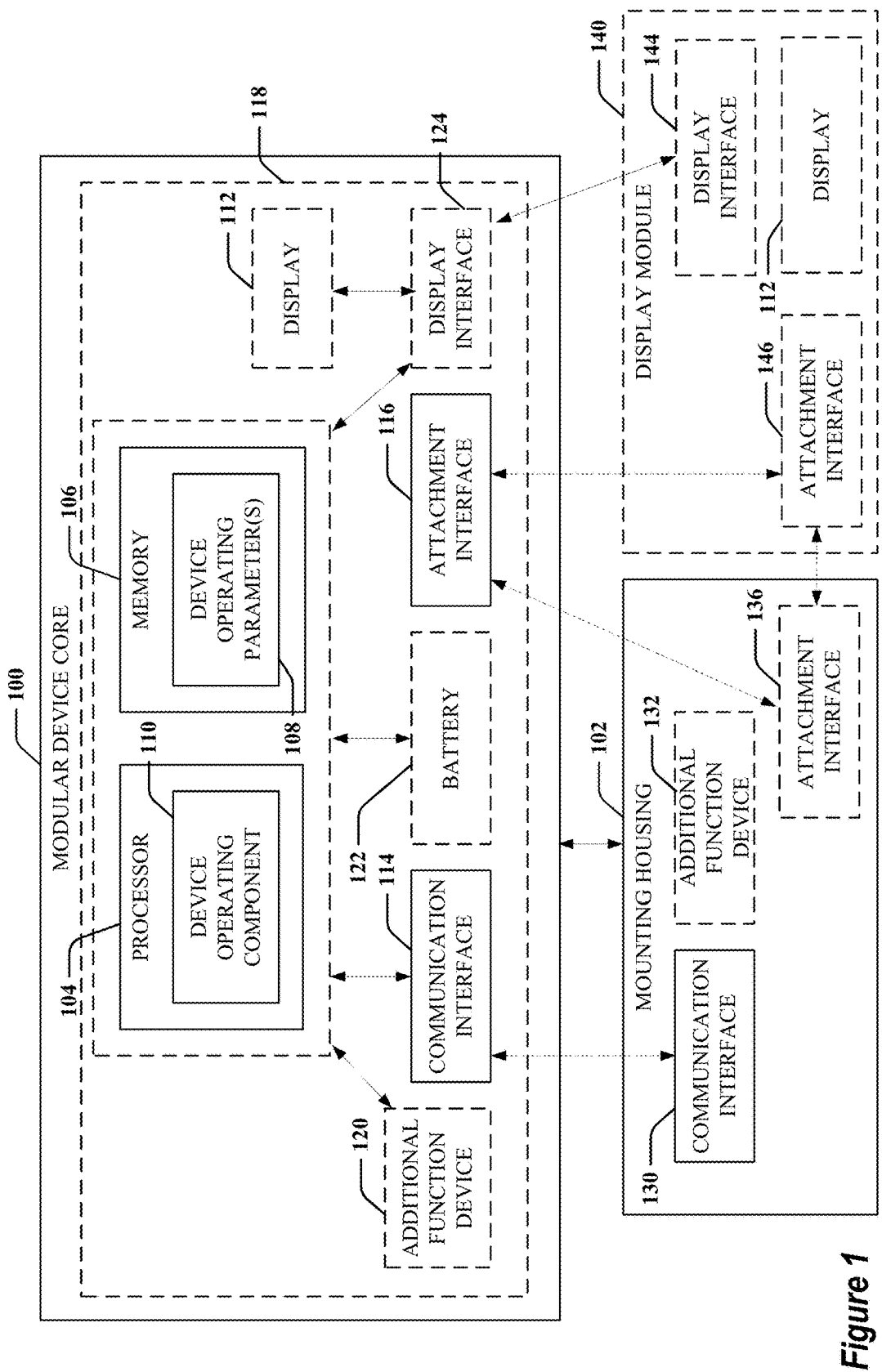
FIG. 1 is a schematic diagram of an example of a modular device core that can be mounted to a mounting housing in accordance with aspects described herein.
Figure 2:
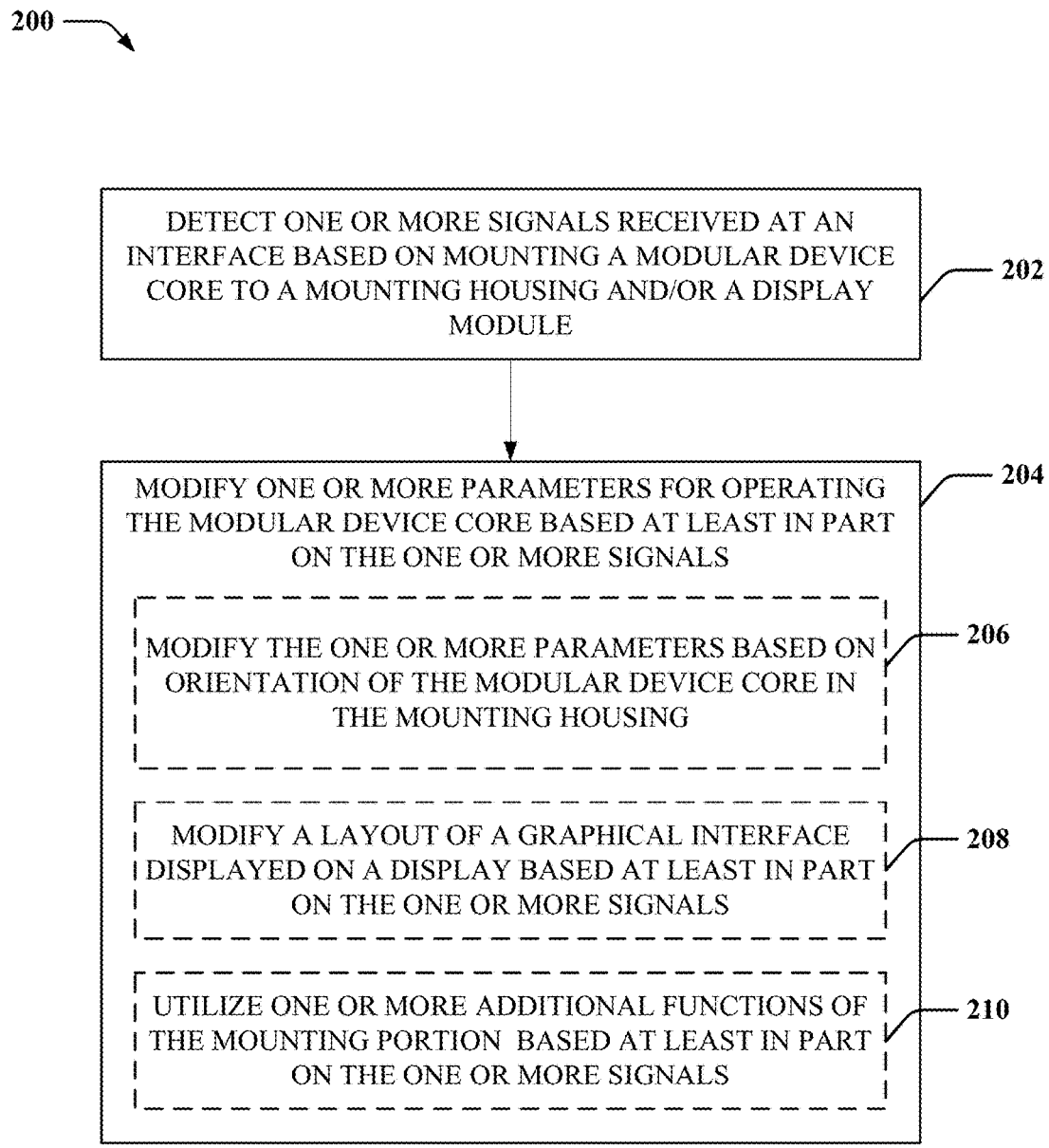
FIG. 2 is a flow diagram of an example of a method for modifying parameters for operating a modular device core in accordance with aspects described herein.

Turning now to FIGS. 1-2, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a modular device core 100 that can be releasably attached to a mounting housing 102 via engagement between attachment interfaces 116 and 136, which may be complimentary in one or more physical properties. The modular device core 100 and mounting housing 102 can be components of a modular wearable device, such as a smart watch, fitness band, or other wearable device. The modular device core 100 can be mounted in various types of mounting housings 102, and the coupling of the modular device core 100 to the mounting housing 102 can cause modification of one or more parameters for operating the modular device core 100. Modular device core 100 may include or may otherwise be coupled with a processor 104 and/or memory 106, where the processor 104 and/or memory 106 may be configured to execute or store instructions or other parameters, such as device operating parameters 108, related to executing a device operating component 110 for operating the modular device core 100. For example, device operating component 110 can correspond to one or more of an operating system of the modular device core 100 (e.g., a mobile operating system), or an application executing on the operating system of the modular device core 100, etc.

In some implementations, modular device core 100 can also include a display 112 having a presentation area, such as a screen, for presenting one or more graphical interfaces (e.g., graphical user interfaces (GUI)), such as to provide information for consumption by a user wearing the modular device core 100. For example, display 112 can be or can include a liquid crystal display (LCD), light emitting diode (LED), organic LED (OLED), high-contrast electronic ink (E-Ink), a fabric including light pipes, micro-LED array, etc., and can display graphical interfaces as instructed by processor 104 (e.g., based on execution of device operating component 110). Modular device core 100 can include a display interface 124 that couples to display 112 to provide instructions, parameters, etc. for displaying the graphical interfaces. In other examples, as described herein, display 112 may be part of a separate display module 140 that can be coupled to the modular device core 100 via the display interface 124 to provide different types of displays (e.g., LCD, LED, OLED, high-contrast E-Ink, micro-LED array, etc.).

Display module 140 can also include a display interface 144 for communicatively coupling the display module 140 to the modular device core 100 to receive instructions, parameters, etc. for displaying the graphical interfaces on display 112 of display module 140. In one example, display module 140 may be integrated into mounting housing 102 as well, such that mounting housing 102 includes the display interface 144 and/or display 112, such that coupling of modular device core 100 to mounting housing 102 (e.g., via attachment interfaces 116, 136) can result in display interface 144 in mounting housing 102 communicating with display interface 124 of modular device core 100 (e.g., in conjunction with communication interfaces 130, 114). For example, the modular device core 100 may releasably attach to the display module 140 (e.g., as a portion of mounting housing 102 or otherwise). In any case, the display interfaces 124 and 144 may be communicatively coupled by a physical connection (e.g., via electrical contacts, such as pins), a wireless connection (e.g., via a Bluetooth, radio frequency identification (RFID), near field communication (NFC), or other interface), etc.

Modular device core 100 can also include a communication interface 114 for communicatively coupling the modular device core 100 with a mounting housing 102. In one example, communication interface 114 can couple with a communication interface 130 of the mounting housing 102, which can cause communication interface 114 to receive one or more signals, which may represent coding from the mounting housing 102 to allow the modular device core 100 to detect a type (or one or more other parameters) of the mounting housing 102 to which it is connected. In one example, receiving one or more signals at communication interface 114 can cause modification of one or more of the device operating parameters 108 for device operating component 110, such as one or more parameters defining an interface displayed on display 112.

In an example, communication interface 114 and/or communication interface 130 can include, but is/are not limited to, one or more electrical contacts that complete an electrical circuit that can be detected by processor 104, one or more electrical contacts corresponding to an interface through which signals can be communicated between the modular device core 100 and the mounting housing 102 (e.g., a universal serial bus (USB) interface, Firewire interface, or substantially any standard or proprietary interface), a wireless interface (e.g., Bluetooth, RFID, NFC, etc.) that may be activated by one or more mechanical, electromechanical, electrical, or magnetic mechanisms (e.g., one or more switches or other mechanical, electrical, or magnetic components) when the modular device core 100 is mounted to the mounting housing 102 to facilitate wireless communication between the modular device core 100 and the mounting housing 102, and/or the like. In a specific example, the modular device core 100 and mounting housing 102 (and/or display module 140) can be physically coupled by magnetic force (e.g., via one or more magnets or ferrous materials on the modular device core 100 and/or mounting housing 102). For example, the one or more magnets may be positioned on the modular device core 100 and/or mounting housing 102 to guide attachment of modular device core 100 to the mounting housing 102 at a desired orientation (e.g., and/or to result in physical and/or communicative coupling of the communication interfaces 114, 130). Additionally, for example, the modular device core 100 may detach from the mounting housing 102 by applying a force in a direction and of sufficient strength to overcome the magnetic attraction, which may also cause physical and/or communicative decoupling of the communication interfaces 114, 130.

Moreover, for example, coupling of the display module 140 to the modular device core 100 via display interfaces 124, 144 can similarly cause or allow the modular device core 100 to determine one or more parameters regarding the user interface to display on the display 112 of display module 140. In one example, coupling of display interface 124 to display interface 144 may cause display interface 144 to provide one or more signals to modular device core 100, which can be detected by device operating component 110 and utilized to determine one or more parameters for operating modular device core 100, displaying one or more user interfaces on display 112, etc. In an example, display interface 124 and/or display interface 144 can include, but are not limited to, one or more electrical contacts that complete an electrical circuit that can be detected by processor 104, one or more electrical contacts through which signals can be communicated between the modular device core 100 and the display module 140, a wireless interface (e.g., Bluetooth, RFID, NFC, etc.) that may be activated by one or more mechanical, electromechanical, electrical, or magnetic mechanisms (e.g., one or more switches or other mechanical, electrical, or magnetic components) when the modular device core 100 is mounted to or otherwise coupled to the display module 140, etc. For example, display module 140 may mount to modular device core 100 using substantially any mechanical attachment mechanism, such as one or more mechanical clips, release mechanisms, magnets, and/or the like to facilitate physical attachment and/or holding of the display module 140 to the modular device core 100. In an example, electrical communication mechanisms may be integrated in the mechanical attachment mechanisms to facilitate communicating one or more signals between the display interfaces 124, 144.

Modular device core 100 can also include at least one attachment interface 116 that is sized, shaped, or otherwise configured to engage with a corresponding at least one attachment interface 136 on mounting housing 102 to at least temporarily affix modular device core 100 to mounting housing 102. For example, in an aspect, attachment interface 116 may be an outside surface of modular device core 100 that is sized to be snap-fit into an inner wall defined in a body of mounting housing 102, a magnetic or ferrous material to facilitate magnetic attraction of the modular device core 100 to the mounting housing 102, etc. In an example, mounting housing 102 can include a recess that can accept physical attachment of the modular device core 100. It should be understood that attachment interface 116 of modular device core 100 and attachment interface 136 of mounting housing 102 may be any other mechanism capable of releasable attachment, such as other mechanical male—female structures, a magnetic attraction force (e.g., based on magnet and a ferrous component), etc. In another example, display module 140 may include an attachment interface 146, which may be similar to one or more interfaces described in relation to attachment interface 136, for releasably attaching modular device core 100 to display module 140. For example, coupling of attachment interface 146 to attachment interface 116 may also result in coupling of display interface 144 to display interface 124.

Modular device core 100 can also include a core retainer 118 that is sized and shaped to fixedly hold the components of modular device core 100. For example, core retainer 118 may be a housing into which processor 104, memory 106, communication interface 114, display 112, and attachment interface 116 are mounted. In addition, modular device core 100 can include one or more additional function devices 120 for providing additional functionality to the modular device core 100, such as a GPS radio, a fitness tracking device (e.g., step tracking device, heart rate or pulse monitor or tracking device, power meter, etc.), an accelerometer, a gyro sensor, an angle or orientation sensor, a compass, a battery, a memory, a processor, communication interface, such as a RFID radio, Bluetooth radio, Wi-Fi radio, etc. In another example, described below, the additional functionality may be additionally or alternatively provided in the mounting housing 102 (e.g., in an additional function device 132). Moreover, for example, modular device core 100 may include a battery 122 or other power source to power components of the modular device core 100.

Beside communication interface 130 and attachment interface 136, in some implementations, mounting housing 102 can also include an additional function device 132 that can provide one or more additional functions for utilization by the modular device core 100 when mounted to the mounting housing 102 (e.g., via communications between interfaces 114, 130). As will be described in various examples, the additional function device 132 may include a GPS radio, a fitness tracking device (e.g., step tracking device, heart rate or pulse monitor or tracking device, power meter, etc.), an accelerometer, a gyro sensor, an angle or orientation sensor, a compass, a battery, a memory, a processor, etc., which can be utilized by or which may complement modular device core 100. For example, mounting housing 102 may provide one or more instructions related to an application programming interface (API) or other mechanism for using the additional function device 132 to modular device core 100 via communication interface 130 when the modular device core 100 is coupled to the mounting housing 102. Device operating component 110, in this example, may utilize the additional function device 132 based on the API and/or based on further communication between communication interfaces 114, 130.

FIG. 2 is a flowchart of an example of a method 200 for modifying device operating parameters based on attaching a modular device core to a mounting housing in accordance with aspects described herein. For example, method 200 can be performed by a modular device core 100 and/or a component thereof when the modular device core 100 is mounted in a mounting housing 102.

At action 202, method 200 includes one or more signals received at an interface based on mounting a modular device core to a mounting housing and/or a display module can be detected. For example, device operating component 110, e.g., in conjunction with processor 104, memory 106, communication interface 114, etc., can detect the one or more signals received at the communication interface 114 based on mounting the modular device core 100 (e.g., mounting at least a portion of a housing of the modular device core 100) to the mounting housing 102 (e.g., to at least a portion of the mounting housing 102). For example, communication interface 114 and/or communication interface 130 may include one or more electrical contacts (e.g., pins) that, when coupled, cause completion of an electrical circuit at the modular device core 100, which may be detected by device operating component 110. In this example, the mounting housing 102 can be passive in that it may not be independently powered or communicate signals directly to the modular device core 100. In a specific example, the modular device core 100 may include various electrical contacts at different positions in core retainer 118 of the modular device core 100, and completion of an electrical circuit can be detected at one or more of the various electrical contacts when the modular device core 100 is mounted on the mounting housing 102, which may cause different actions in the modular device core 100, as described further herein.

In another example, device operating component 110 can detect the one or more signals based on affixing the modular device core 100 to the mounting housing 102, e.g., including a communicative coupling between communication interface 114 and communication interface 130. Completion of such a releasable connection can cause one of the mounting housing 102 or modular device core 100 to initiate communications via communication interface 130 or 114, by which mounting housing 102 can communicate the one or more signals to the modular device core 100. In this example, the mounting housing 102 can be active, thus being independently powered and/or configured to communicate signals to modular device core 100 via communication interface 130. In this example, device operating component 110 can detect mounting of the modular device core 100 to mounting housing 102 via engagement of one or more electrical contacts (e.g., by which communications can occur between communication interface 114 and 130), activation of a different mechanical or electromechanical mechanism (e.g., one or more switches on modular device core 100 and/or mounting housing 102) caused when coupling the modular device core 100 to the mounting housing 102, receiving the one or more signals over communication interface 114, etc. In another example, as described, mounting of the modular device core 100 to mounting housing 102 can cause activation of communication interface 114 and/or 130, and/or establishment of a connection therebetween (e.g., via Bluetooth, RFID, NFC, etc.), and device operating component 110 can detect the activation of communication interface 114, establishment of the connection with communication interface 130, and/or the like.

Similarly, in an example, device operating component 110, e.g., in conjunction with processor 104, memory 106, display interface 124, etc., can detect the one or more signals received at the display interface 124 based on mounting the modular device core 100 (e.g., mounting at least a portion of a housing of the modular device core 100) to the display module 140 (e.g., to at least a portion of the display module 140). As described, display interface 124 and display interface 144 may include one or more electrical contacts, a wireless interface, etc. over which signals can be communicated for indicating one or more parameters for operating modular device core 100, for displaying one or more user interfaces on display 112, etc.

At action 204, method 200 includes modifying one or more parameters for operating the modular device core based at least in part on the one or more signals. For example, device operating component 110, e.g., in conjunction with processor 104, memory 106, communication interface 114, display interface 124, etc., can modify the one or more parameters for operating the modular device core 100 (e.g., one or more device operating parameters 108) based at least in part on the one or more signals. Where the modular device core 100 has various electrical contacts positioned on the housing of the modular device core 100, for example, device operating component 110 can modify different device operating parameters 108 based on detecting completion of an electrical circuit at different ones of the various electrical contacts of the modular device core 100. Where the modular device core 100 activates communication interface 114 based on coupling of the modular device core 100 to mounting housing 102 (e.g., via engagement of electrical contacts, a mechanical or electromechanical mechanism, etc.), device operating component 110 can modify different device operating parameters 108 based on the properties or contents of the one or more signals received via communication interface 114. Similarly, where the modular device core 100 activates display interface 124 based on coupling of the modular device core 100 to display module 140 (e.g., via engagement of electrical contacts, a mechanical or electromechanical mechanism, etc.), device operating component 110 can modify different device operating parameters 108 based on the properties or contents of the one or more signals received via display interface 124

In an example, modifying the one or more parameters at action 204 may optionally include, at action 206, modifying the one or more parameters based on orientation of the modular device core in the mounting housing. For example, device operating component 110, e.g., in conjunction with processor 104, memory 106, communication interface 114, etc., can modify the one or more parameters based on orientation of the modular device core 100 in the mounting housing 102. In a specific example, the mounting housing 102 (e.g., a body of the mounting housing 102) can provide a plurality of different mounting orientations for the modular device core 100, and can include electrical contacts that couple to different electrical contacts of the modular device core 100 (e.g., on a housing of the modular device core 100) based on the mounting orientation of the modular device core 100. For example, device operating component 110 can detect the orientation of the modular device core 100 based on the electrical contacts of the modular device core 100 engaged by the mounting housing 102, and can accordingly modify the one or more device operating parameters 108 based on the electrical contacts engaged.

Where the modular device core 100 activates communication interface 114 based on coupling of the modular device core 100 to mounting housing 102 (e.g., via engagement of electrical contacts, a mechanical or electromechanical mechanism, etc.), device operating component 110 can modify the one or more parameters based on detecting orientation of the modular device core via contents or properties of the one or more signals received from the mounting housing 102. In another specific example, modular device core 100 may have a standardized size and/or shape and/or attachment interface 116 that may allow the modular device core 100 to be affixed to any number of different mounting housings 102 that each hold the modular device core 100 in a different relative orientation (e.g., a longitudinal axis of the modular device core 100 may be in different relative orientations when affixed to different mounting housings 102, for example, in the form of mounting straps 404 and 414). As such, modular device core 100 may able to operate using different sets of parameters that each correspond to one of the different orientations of the modular device core 100. In other words, in a case where different mounting housings 102 hold the modular device core 100 in different orientations, the modular device core 100 may operate differently in each of the different mounting housings 102 based on using a different set of orientation-specific parameters.

Thus, in one example, mounting housing 102 may determine the orientation of the modular device core 100 relative to the mounting housing 102 when affixed to the mounting housing 102, and may accordingly indicate the orientation in communications from communication interface 130 to communication interface 114. In a specific example, the possible orientations may include a portrait or landscape orientation (e.g., or substantially any opposing orientations when rotating the modular device core 100 substantially 90 degrees; see FIG. 4 for examples of different relative orientations). As such, the modular device core 100 may operate using orientation-specific parameters, which may effectively provide the modular device core 100 with different, orientation-specific capabilities (including different functionalities and/or different user interfaces, as discussed below). For example, a portrait orientation of the modular device core 100 may cause a different interface to be displayed on display 112 than a landscape orientation. For example, the different interface can be displayed on display 112 to allow for viewing at the determined orientation of the modular device core 100, and/or may include a greater or lesser number of display fields.

In a specific example, modifying the one or more parameters at action 204 may optionally include, at action 208, modifying a layout of a graphical interface displayed on a display based at least in part on the one or more signals. For example, device operating component 110, e.g., in conjunction with processor 104, memory 106, communication interface 114, display interface 124, etc., can modify the layout of the graphical interface displayed on the display 112 based at least in part on the one or more signals. In an example, device operating component 110, in this regard, may modify the one or more device operating parameters 108 related to layout of the graphical interface on display 112, whether on modular device core 100 or separate display module 140. The one or more device operating parameters 108 related to the layout may include orientation of the graphical interface (e.g., landscape format or portrait format), a size, color scheme, font type, font size, etc. used in the graphical interface, a layout of widgets, fields, etc. displayed on the graphical interface, one or more icons displayed on the graphical interface, a hierarchy of graphical interfaces to be displayed (e.g., based on activation of a button, a swiping gesture on or near the display 112, etc. to switch among the hierarchy of graphical interfaces displayed on display 112), and/or the like.

For example, where the modular device core 100 and mounting housing 102 include various electrical contacts, where a first one or more electrical contacts are engaged, device operating component 110 can modify the one or more device operating parameters 108 to modify a layout of a graphical interface displayed on display 112 as opposed to where a second one or more electrical contacts are engaged. In a specific example, device operating component 110 can modify the one or more device operating parameters 108 to modify the layout of the graphical interface to be in a landscape orientation where the first one or more electrical contacts are engaged, or a portrait orientation where the second one or more electrical contacts are engaged. In another example, engagement of different electrical contacts may cause different font type or sizes, different fields, different widgets (e.g., graphical representations of data typically of a fixed size on the display 112 and associated with an application), etc. to be displayed on the graphical interface, and thus different mounting housings 102 may have electrical contacts in different positions to cause display of different graphical interfaces. For example, a mounting housing 102 for fitness may have electrical contacts positioned differently than a mounting housing 102 for general wear/use, and may thus cause modular device core 100 to display a different graphical interface (e.g., with different font type or sizes, different fields, such as heart rate, number of steps, etc.) when mounted in the appropriate mounting housing 102 and contacting the corresponding electrical contacts. The various graphical interface layouts and corresponding electrical contacts can be configured and/or configurable in the modular device core 100.

In another example, as described, this functionality may be provided by parameters, instructions, etc. in communications from the mounting housing 102 via communication interface 130 when the modular device core 100 is mounted to mounting housing 102. For example, mounting housing 102 may provide instructions or parameters related to the graphical interface to be displayed to modular device core 100 via communication interface 130 to communication interface 114 in the one or more signals when the modular device core 100 is mounted in mounting housing 102. For example, the instructions or parameters can be communicated via electrical contacts between the mounting housing 102 and modular device core 100 where the communication interface 130, 114 includes the electrical contacts, via another communication interface 130, 114 (e.g., wireless interface) between mounting housing 102 and modular device core 100 where detection of mounting can be via a mechanical or electromechanical mechanism (e.g., a switch), etc.

Similarly, in this example, modifying the layout may include modifying widgets, data fields, etc. displayed on the display 112 based on one or more instructions or parameters from the mounting housing 102. In one example, the modular device core 100 can display fields corresponding to data that can be captured by, or is otherwise indicated as related to, the mounting housing 102. In a specific example, the modular device core 100 be inserted into a fitness band housing, and can accordingly receive parameters related to displaying heartrate or other data that can be captured by the fitness band housing. In another example, when the modular device core 100 is ejected from the fitness band housing and/or inserted into another mounting housing, such as a watch band, the modular device core 100 may not display heartrate, and may instead display time, date, etc., one or more time/date widgets, etc. Moreover, in this regard, when the modular device core 100 be inserted into a fitness band housing, the one or more parameters can relate to displaying a different (e.g., smaller) time field/widget to allow for more prominently displaying heartrate or other fitness data.

In another specific example, modifying the one or more parameters at action 204 may optionally include, at action 210, utilizing one or more additional functions of the mounting housing based at least in part on the one or more signals. For example, device operating component 110, e.g., in conjunction with processor 104, memory 106, communication interface 114, etc., can utilize the one or more additional functions, of an additional function device 132, of the mounting housing 102 based at least in part on the one or more signals. For example, where the one or more signals relate to completion of an electrical circuit via electrical contacts, the electrical contacts may provide the communication interface 114 to the additional function device 132. In another example, the one or more signals may be received via communication interface 114 from communication interface 130 via electrical contacts and/or a wireless interface (e.g., Bluetooth, RFID, NFC, etc.), and may include instructions, one or more parameters, an API, etc. for accessing the additional function device 132 via communication interface 130. In this example, device operating component 110 may access the additional function device 132 based on the one or more instructions, parameters, API, etc. In addition, for example, device operating component 110 may allow applications executing on modular device core 100 (e.g., via processor 104) to access the additional function device 132 via device operating component 110 (e.g., by providing an associated API, operating instructions, etc.).

For example, the additional function device 132 may include a power source (e.g., a battery) for supplying power to modular device core 100. In this example, interfaces 114 and 130 can include electrical contacts that, when coupled when modular device core 100 is mounted to mounting housing 102, can cause power to be supplied from additional function device 132 to modular device core 100. Device operating component 110 can utilize the power to charge a battery 122 of modular device core 100, to power modular device core 100 (e.g., instead of or in conjunction with a battery of modular device core 100), etc.

In another example, additional function device 132 may include a GPS radio, and device operating component 110 can utilize the GPS radio (e.g., by communicating with communication interface 130 by communication interface 114) to provide GPS functions, such as location determination for the modular device core 100, device operating component 110, and/or one or more applications, etc. In an example, additional function device 132 may include a fitness tracking device, such as a step-tracker, heart rate or pulse monitor, power meter, an interface to another fitness device (e.g., cardiovascular or other exercise equipment), etc., and device operating component 110 can utilize the fitness tracking device (e.g., by communicating with communication interface 130 by communication interface 114) to provide fitness tracking functions, such as step-tracking, heart rate or pulse monitoring, power tracking, an angle or orientation sensor, communications with another fitness device, etc. for the modular device core 100, device operating component 110, and/or one or more applications, etc.

In any case, modifying the one or more parameters at action 204 can be based on explicit instructions (e.g., coding information) received in the one or more signals from the mounting housing 102 for modifying the one or more device operating parameters 108, modifying a layout of a graphical interface (e.g., including modifying an orientation of the layout and/or data fields/widgets selected to be displayed on the graphical interface), determining instructions, interfaces, etc. for utilizing one or more additional functions of the mounting housing 102, etc. In another example, modifying the one or more parameters at action 204 can be based on a configured mapping of one or more properties of the one or more signals to instructions for modifying the one or more device operating parameters 108, modifying a layout of a graphical interface, determining additional instructions, interfaces, etc., which may be stored in or otherwise configured to memory 106 of the modular device core 100, for utilizing one or more additional functions of the mounting housing 102, etc.

Figure 3:
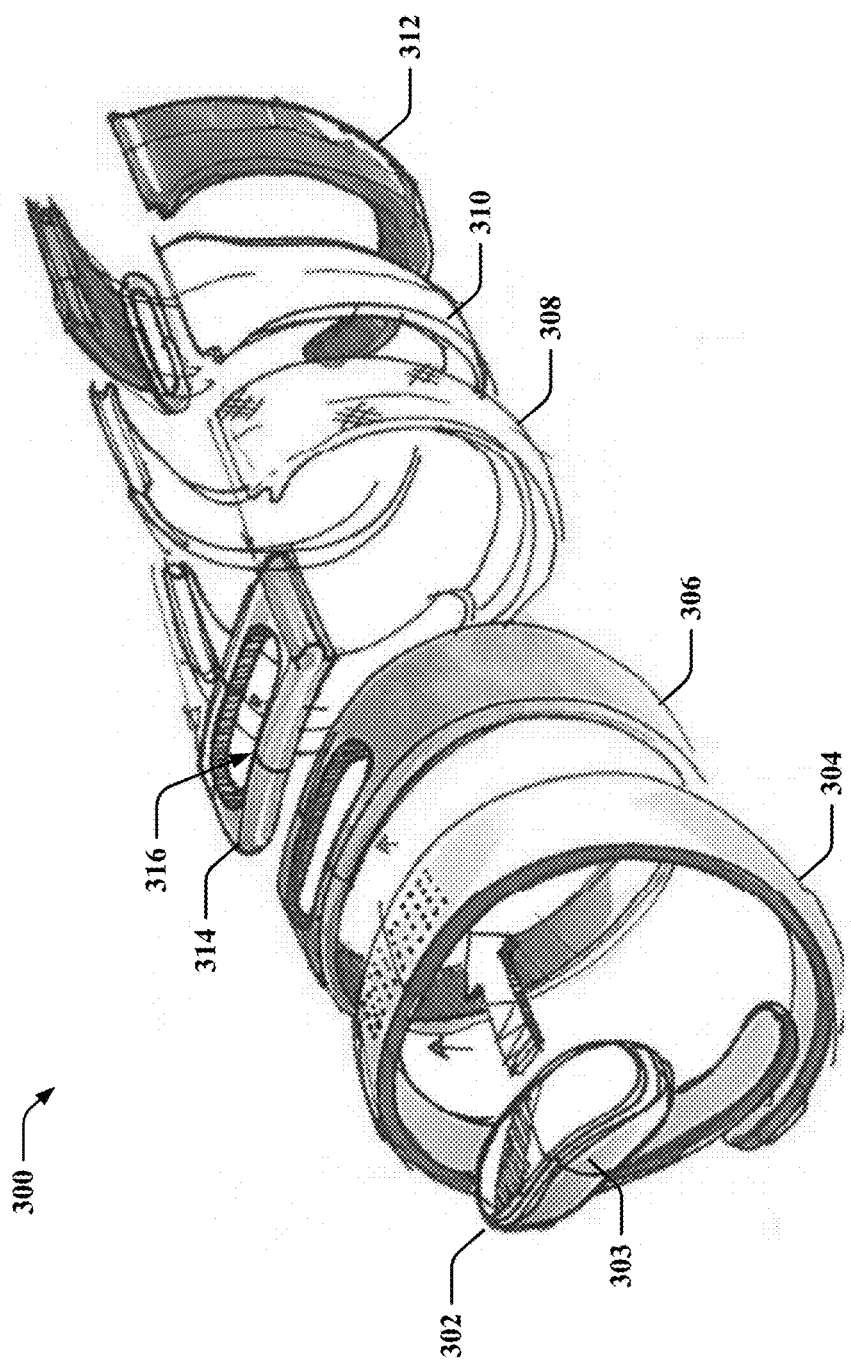
FIG. 3 is a perspective view of example mounting straps for an example modular device core in accordance with aspects described herein.

FIG. 3 illustrates an example of various configurations of different wearable modular components 300 that may be assembled by adding a modular device core 302, which may be the same as or similar to modular device core 100 and which may have a core retainer 303 that houses components of the modular device core 302 and releasably attaches to one of a plurality of different mounting straps 304, 306, 308, 310, 312. Additionally, for example, the mounting straps 304, 306, 308, 310, 312, may be the same as or similar to (e.g., may include the same or similar components as) mounting housing 102. Also, in some examples, the modular device core 302 may be releasably fixed to a mounting shroud 314 for securing the modular device core 302 to one or more of the mounting straps, e.g., mounting straps 308, 310, and 312. As such, in one example, the mounting shroud 314 may be the same as or similar to (e.g., may include the same or similar components as) mounting housing 102. The modular device core 302 can be mounted in the one or more mounting straps 304, 306, 308, 310, 312 in various orientations and/or configurations (e.g., under the strap 304, 306, within straps 308, 310, 312 (e.g., with shroud 314), etc.). For example, each of mounting straps 304, 306, 308, 310, 312, and/or mounting shroud 314, in one example, may have electrical contacts that may be positioned differently to cause different parameters of modular device core 302 to be modified when the electrical contacts engage corresponding electrical contacts of modular device core 302, as described.

In an example, each of mounting straps 304, 306, 308, 310, 312, and/or mounting shroud 314 can define a recess or aperture 316 that accepts physical attachment of the modular device core 302, or at least a core retainer 303. In another example, each of mounting straps 304, 306, 308, 310, 312, and/or mounting shroud 314, in one example, may have an interface that can establish a connection with an interface on modular device core 302 to provide instructions, parameters, etc. for modular device core 302 to modify one or more device operating parameters, as described, and/or to utilize one or more additional function devices that may be included in each of mounting straps 304, 306, 308, 310, 312, and/or mounting shroud 314. As described, for example, each of mounting straps 304, 306, 308, 310, 312, and/or mounting shroud 314 may have a mechanical or electromechanical mechanism to detect mounting of modular device core 302 within the strap and/or shroud (e.g., within the recess or aperture 316), and may accordingly establish a connection with modular device core 302 via interfaces (e.g., by electrical contacts, wireless interfaces, etc.) for providing instructions to modular device core 302 to modify the one or more device operating parameters, instructions for utilizing one or more additional devices in the strap, etc. In any case, an electrical or other connection and coding can be provided between the modular device core 302 and the straps and/or shroud such that the graphical interface can change partially or completely in layout and/or in function based on a design of the strap and corresponding signals communicated to the modular device core 302 based on mounting in the strap.

Additionally, in an aspect, mounting strap 304 can be a light pipe strap at which modular device core 100 can illuminate lights over certain apertures to generate a desired interface (e.g., one or more numbers to indicate time, number of steps, power, or other data).

Figure 4:
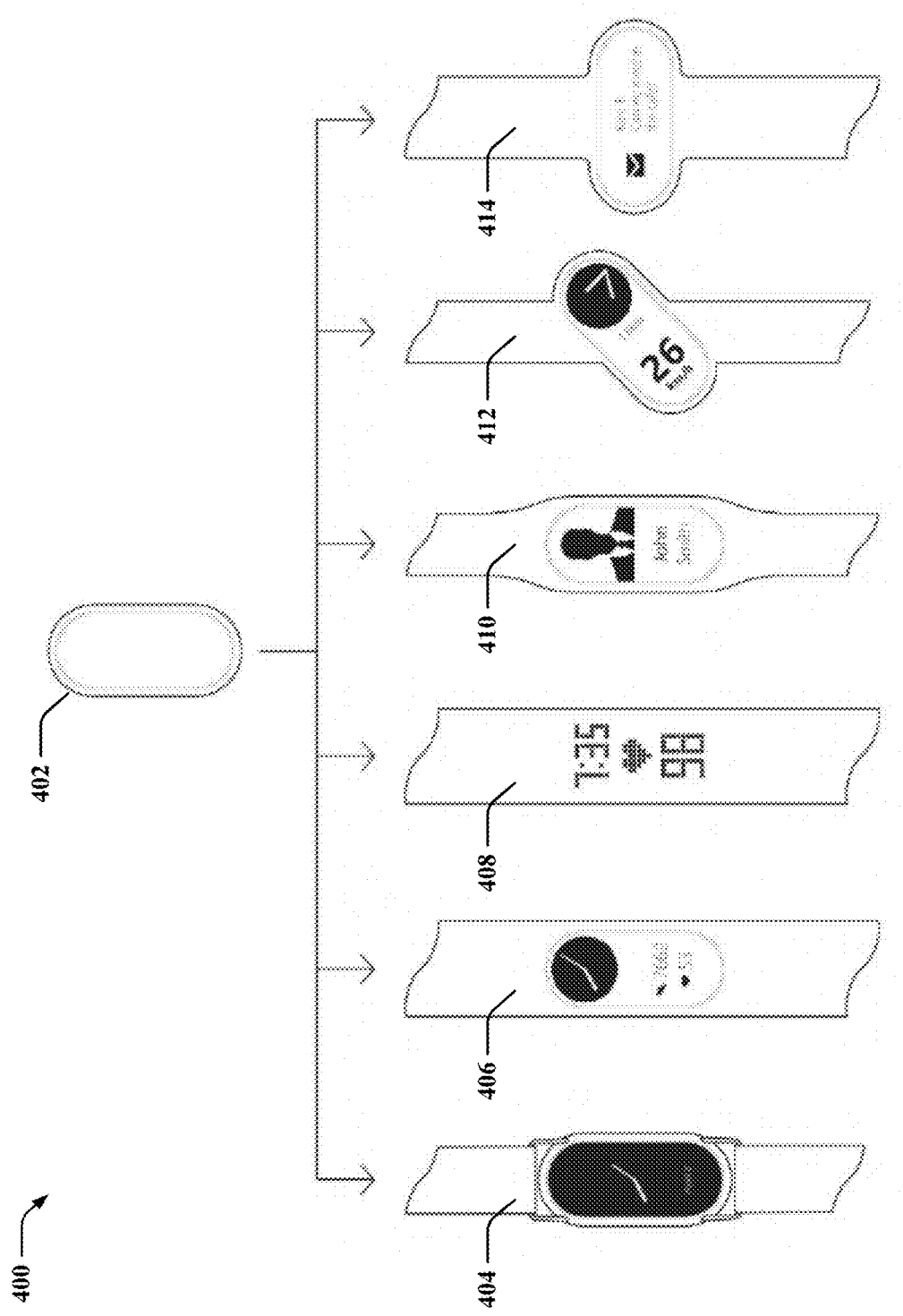
FIG. 4 is a front view of example mounting housing, in the form of straps or wrist bands, for an example modular device core in accordance with aspects described herein.

FIG. 4 illustrates an example of various configurations of wearable modular components 400 that may be formed by combining a modular device core 402, which may be the same as or similar to modular device core 100, with respective ones of a plurality of different mounting straps 404, 406, 408, 410, 412, 414, which may be the same as or similar to mounting housing 102, and/or one or more of the mounting straps 304, 306, 308, 310, 312. For example, as shown, mounting of modular device core 402 within the different mounting straps 404, 406, 408, 410, 412, 414 can cause modification of a layout of a graphical interface displayed by the modular device core 402. For example, as described, modification of the layout can be caused by modular device core 402 detecting engagement of certain electrical contacts on a housing of modular device core 402, and accordingly determining a layout that corresponds to engaging the electrical contacts. In an example, a layout for each electrical contact(s) can be configured and/or configurable in the modular device core 402.

In another example, modification of the layout can be caused by modular device core 402 receiving one or more instructions or parameters from an interface of given mounting strap 404, 406, 408, 410, 412, 414 (e.g., based on engaged electrical contacts between the modular device core 402 and mounting strap, establishment of a wired or wireless interface connection between interfaces of the modular device core 402 and mounting strap, etc., which may be based on detected coupling of electrical contacts, as described). In this example, modular device core 402 can receive the instructions or parameters and accordingly modify the layout of the graphical interface. In any case, information displayed by the graphical interface of the modular device core 402 (e.g., a fundamental style of the interface, such as an analog watch for mounting strap 404, an analog watch and one or more fitness functions or corresponding data fields for mounting strap 406, a digital watch and pulse rate for mounting strap 408, a phone, contact, and/or picture display for mounting strap 410, a navigation and speed display for mounting strap 412, a landscape oriented email display for mounting strap 414, etc.) can change based on the mounting strap, and the change can be automatic based on detection of coding information within the given mounting strap. In one example, one or more parameters of an interface to be displayed can be configured at the modular device core 100 for displaying when a specified type of mounting strap is engaged to the modular device core 100. For example, various types of mounting strap to interface parameter mappings can be configured in the modular device core 100 (e.g., as default, based on user input, etc.).

Figure 5:
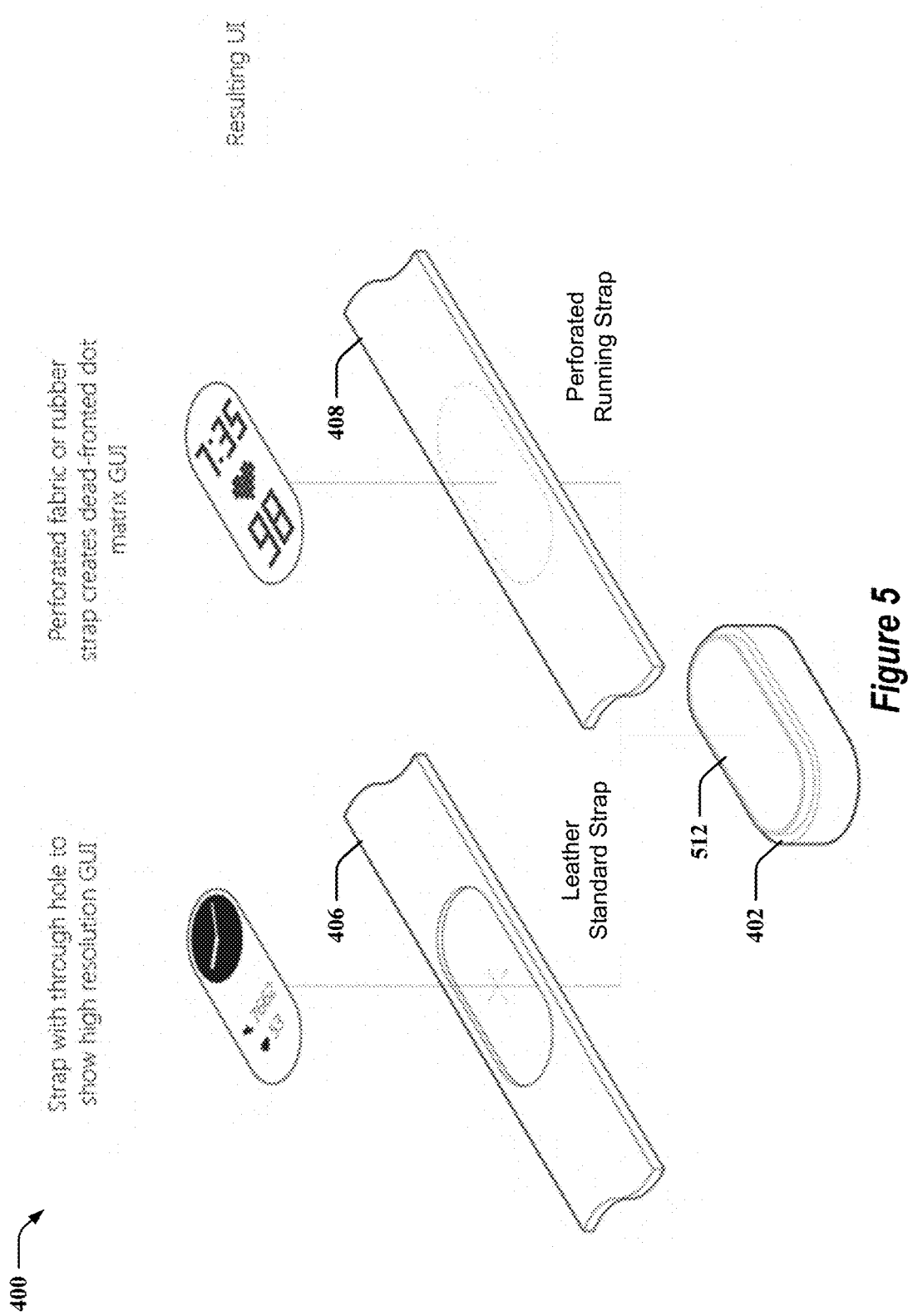
FIG. 5 is a perspective view of example mounting housing, in the form of straps or wrist bands, for an example modular device core in accordance with aspects described herein.

FIG. 5 illustrates an example of various configurations of wearable modular components 400 from FIG. 4 in a perspective view. In this example, straps 406 and 408 are depicted with modular device core 402. In these examples, the modular device core 402 can be coupled to the straps 406 and 408 at a lower portion. Strap 406 can include a through hole within which modular device core 402 can fit such that a display 512 of the modular device core 402 (which can be a high resolution display, such as a LCD, LED, OLED, etc.) can be seen via the through hole of strap 406, which may display a clock and other data fields. Strap 408 can include a perforated fabric or rubber strap that can create a deadfronted dot matrix user interface by limiting portions of display 512 that can be seen through the strap 408, which may display a digital clock and other data fields.

Figure 6:
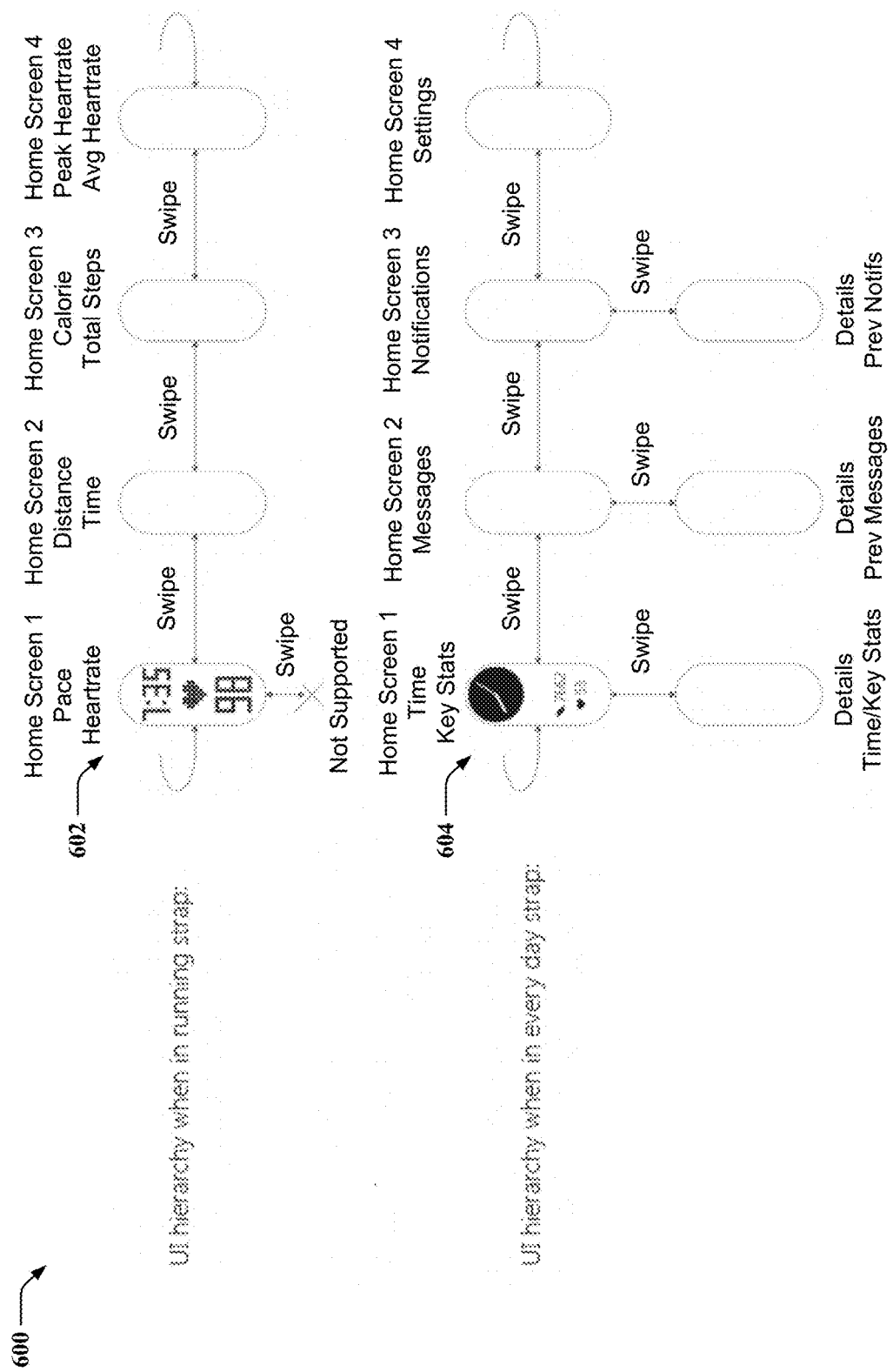
FIG. 6 is a front view of example user interface hierarchies for display by a modular device core in accordance with aspects described herein.

FIG. 6 illustrates examples of various user interfaces 600 for display on a display of a modular device core, which can change based on a mounting housing and/or display interface to which the modular device core is coupled. User interfaces 600 can include a hierarchy of interfaces 602 that can be displayed when the modular device core is coupled to a running strap (e.g., strap 408), which can include user interfaces related to displaying a running pace and a hear rate, a distance and time, calorie consumption and total steps, peak heart rate and average heart rate, etc. For example, the hierarchy of interfaces 602 can be switched via a swiping gesture (from side-to-side). In this example, and referring to FIG. 1, device operating component 110 can determine the hierarchy of interfaces 602 to display based on detecting coupling of the modular device core 100 to a mounting housing 102 that includes running strap 408, based on a configuration within the modular device core 100 related to running strap 408, etc.

User interfaces 600 can alternatively include a hierarchy of interfaces 604 that can be displayed when the modular device core is coupled to a generic functionality strap (e.g., strap 406), which can include user interfaces related to displaying a time and selected statistics, messages, notifications, settings, and/or related details, etc. For example, the hierarchy of interfaces 602 can be switched via a swiping gesture (from side-to-side, top-to-bottom, or bottom-to-top). In this example, and referring to FIG. 1, device operating component 110 can determine the hierarchy of interfaces 604 to display based on detecting coupling of the modular device core 100 to a mounting housing 102 that includes generic functionality strap (e.g., strap 406), based on a configuration within the modular device core 100 related to generic functionality straps (e.g., strap 406), etc.

Figure 7:
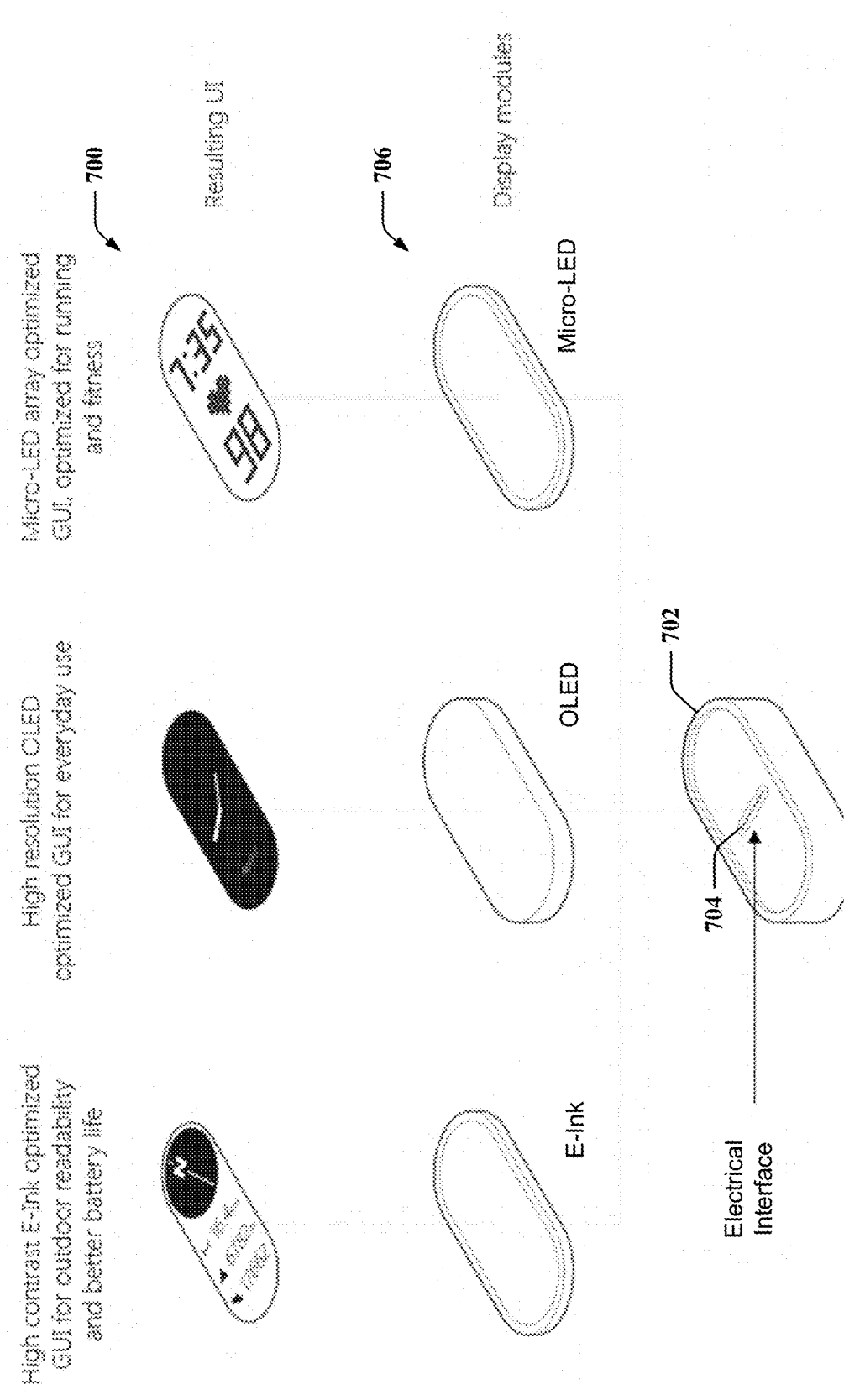
FIG. 7 is a perspective view of example display modules attachable to an example modular device core in accordance with aspects described herein.

FIG. 7 illustrates examples of various user interfaces 700 for display on a display module 706, where the display module 706 can be separate from a modular device core 702. In this example, modular device core 702, which can include a modular device core (e.g., modular device core 100) can have an electrical interface 704 (e.g., a display interface 124) for coupling the modular device core 702 to one of various display modules 706. Based on the display module 706 coupled to modular device core 702, modular device core 702 can select one or more user interfaces 700 for displaying on a display of the display module 706. For example, display module 706 may provide one or more signals to the modular device core 702 via electrical interface 704 when coupled thereto, as described, to allow the modular device core 702 to determine a user interface 700 for displaying via the display module 706. Specific examples of display modules 706 are shown, which include an E-Ink display module, a OLED display module, and a micro-LED display module, which result in modular device core 702 displaying, respectively, a high-contrast E-Ink interface (which may provide outdoor readability and better battery life), a high resolution OLED display (which may be desirable for generic use), and a micro-LED user interface (which may provide running or fitness data).

Figure 8:
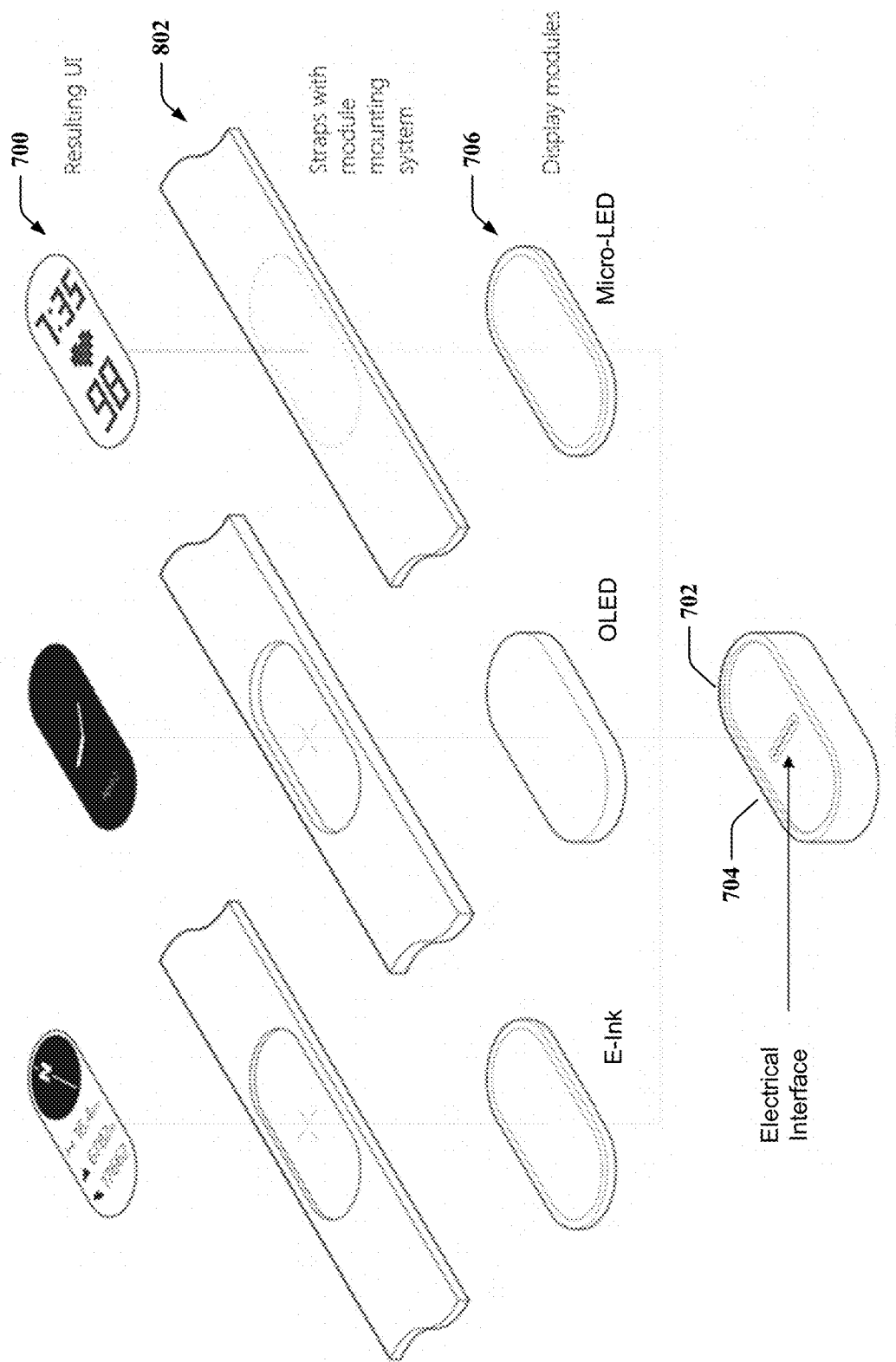
FIG. 8 is a perspective view of example display modules attachable to an example modular device core and associated straps or wrist bands in accordance with aspects described herein.

Additionally, in this example, modular device core 702 may include one or more components, such as a processor, memory, battery, sensor(s), etc., as described with respect to modular device core 100 above. In this example, different display modules 706 can be added with different functionality depending on use. Data can be transmitted via the electrical interface 704 between the modular device core 702 and display modules 706. FIG. 8 illustrates the examples of the various user interfaces 700 where the display modules 706 can couple to different straps 802 as well (e.g., via attachment interfaces 146, 136, as described above).

Figure 9:
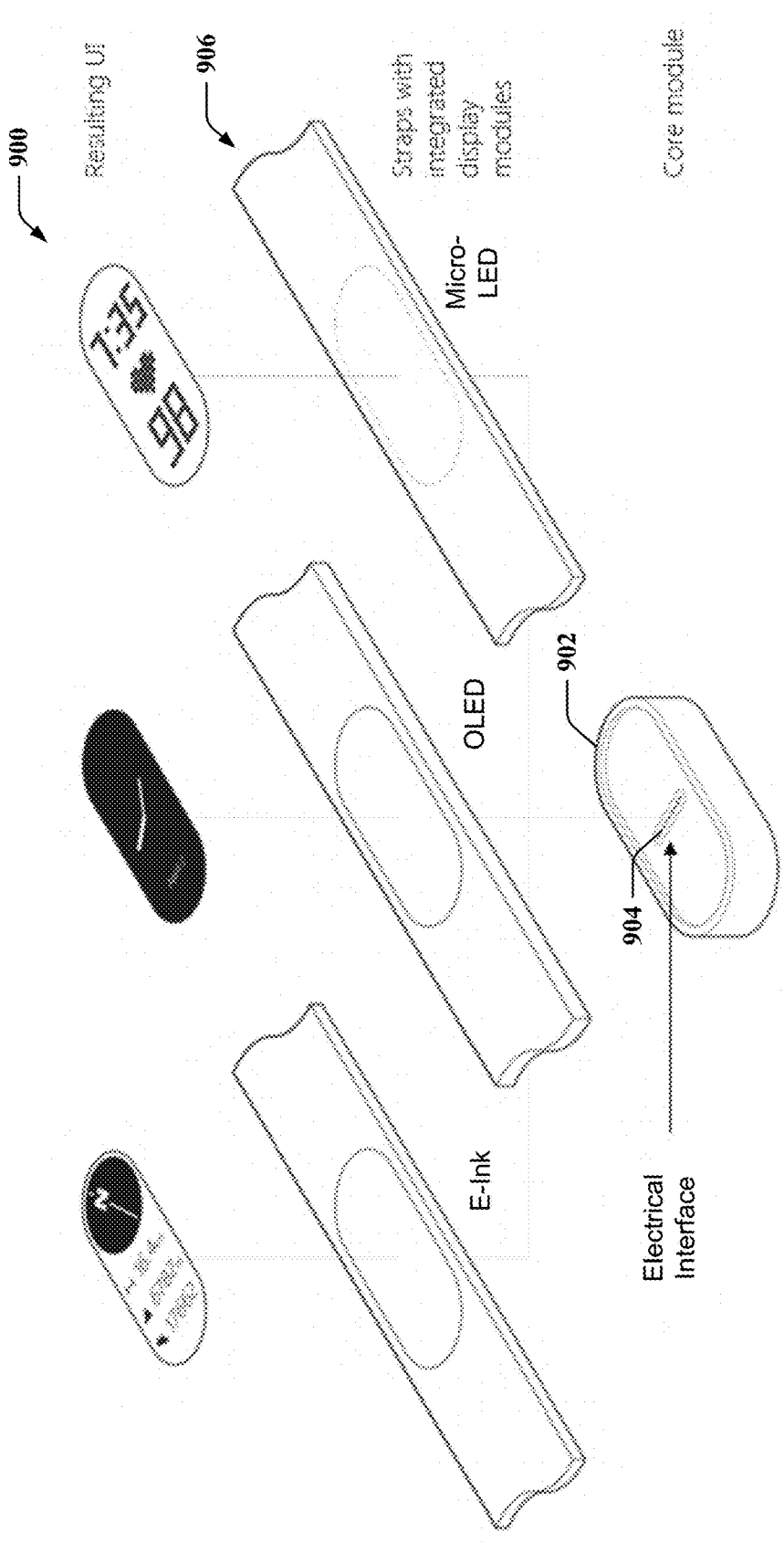
FIG. 9 is a perspective view of example straps or wrist bands having integrated display modules attachable to an example modular device core in accordance with aspects described herein.
Figure 10:
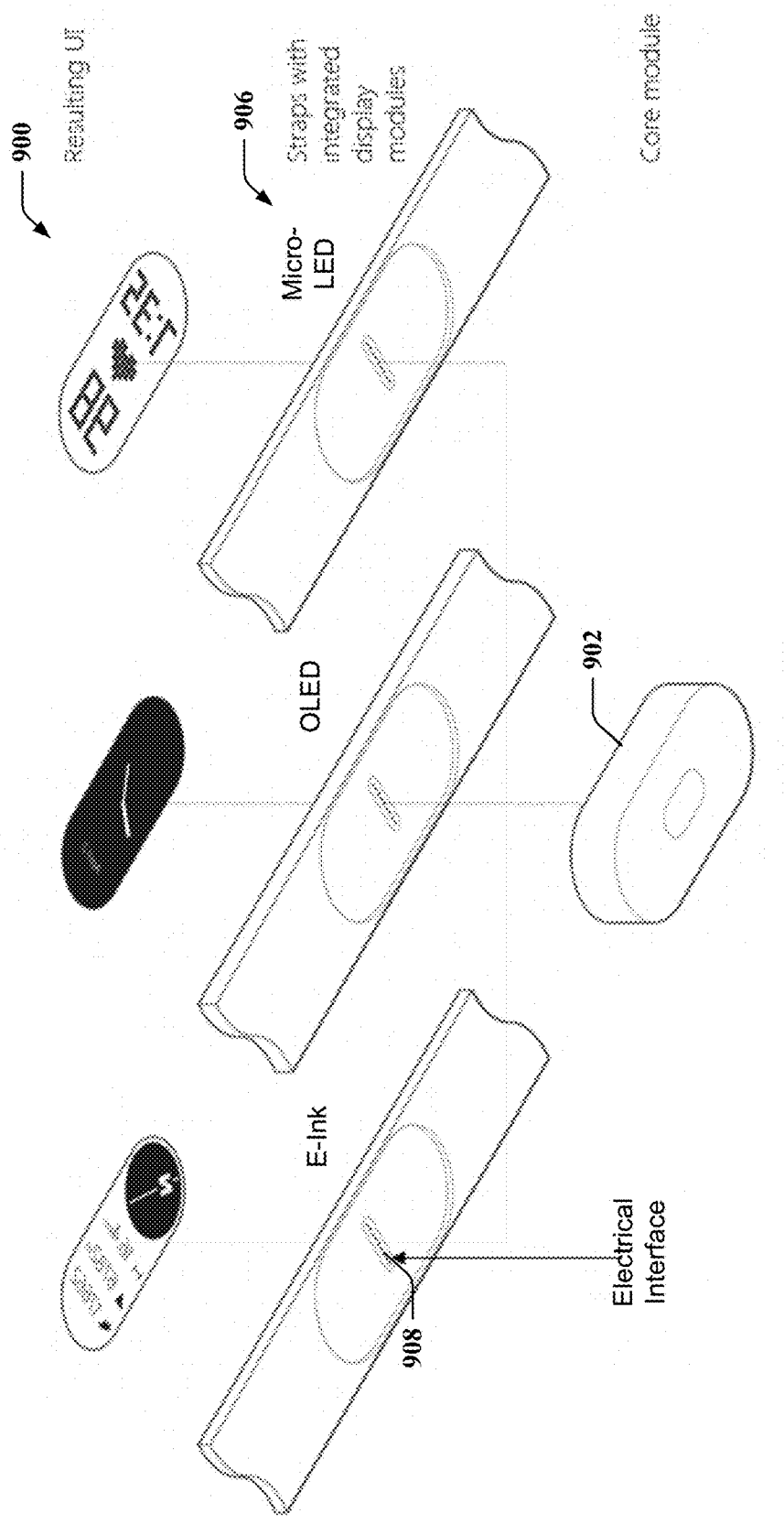
FIG. 10 is a perspective view of example straps or wrist bands having integrated display modules attachable to an example modular device core via an electrical interface in accordance with aspects described herein.

FIG. 9 illustrates examples of various user interfaces 900 for display on a strap 906 with an integrated display module. In this example, modular device core 902, which can include a modular device core 100, can have an electrical interface 904 (e.g., a display interface 124, communication interface 114, etc.) for coupling the modular device core 902 to the display modules in one of various straps 906. Based on the display module or associated strap 906 coupled to modular device core 902, modular device core 902 can select one or more user interfaces 900 for displaying on a display of the strap 906. For example, strap 906 may provide one or more signals to the modular device core 902 via electrical interface 904 when coupled thereto, as described, to allow the modular device core 902 to determine a user interface 900 for displaying on the strap 906 via the associated display module. Specific examples of straps 906 are shown, which include a strap with an E-Ink display module, a strap with a OLED display module, and a strap with a micro-LED display module, which result in modular device core 902 displaying, respectively, a high-contrast E-Ink interface (which may provide outdoor readability and better battery life), a high resolution OLED display (which may be desirable for generic use), and a micro-LED user interface (which may provide running or fitness data). As shown in FIG. 10, the straps 906 may include an electrical interface 908 (e.g., display interface 144, communication interface 130, etc.) for coupling the modular device core 902 to the strap 906, as described herein.

Figure 11:
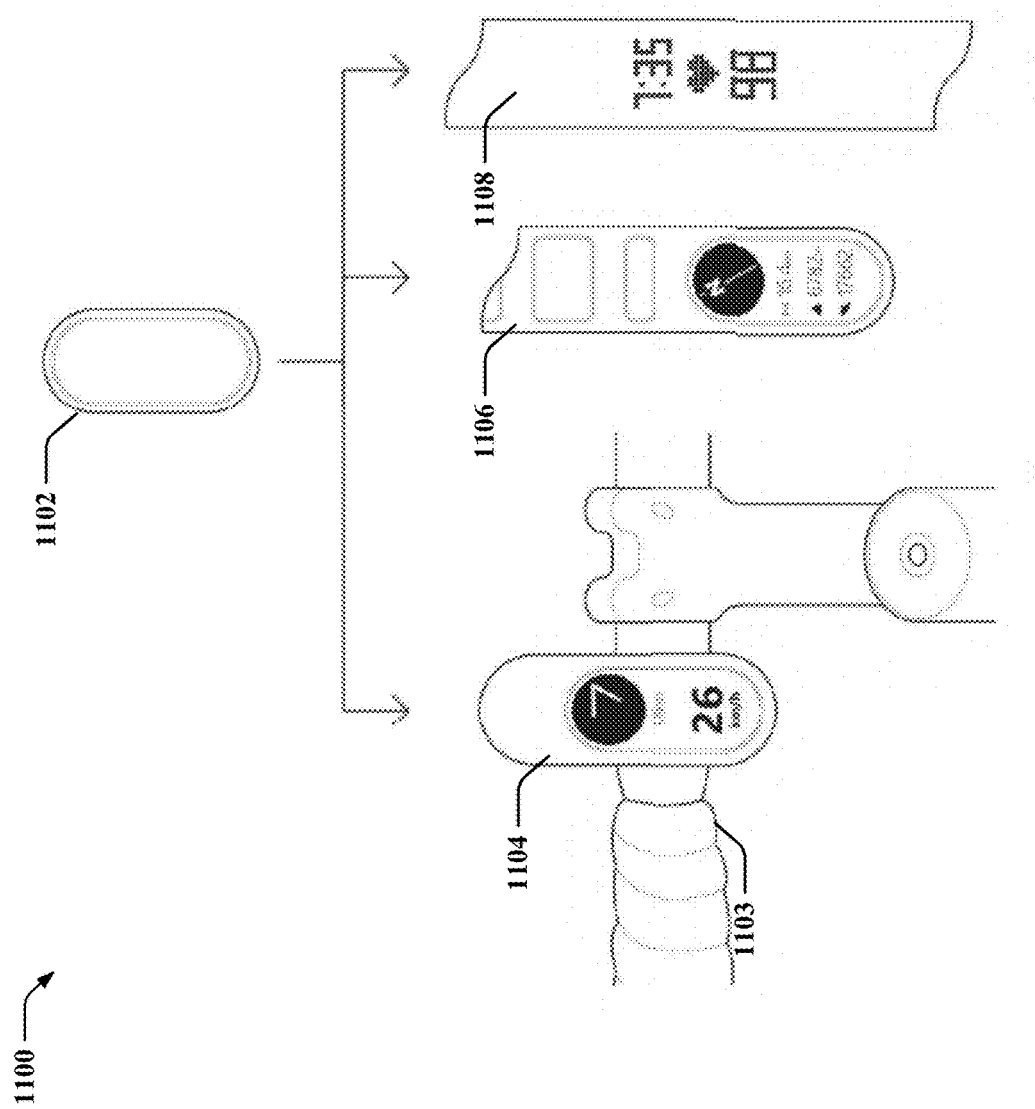
FIG. 11 is a front view of example mounting housings for an example modular device core in accordance with aspects described herein.

FIG. 11 illustrates an example of various configurations of wearable or mountable modular components 1100 that result from affixing a modular device core 1102, which may be the same as or similar to modular device core 100, to respective ones of a plurality of different mounting housings 1104, 1106, 1108, which may be the same as or similar to mounting housing 102. For example, as shown, mounting of modular device core 1102 within the different mounting housings 1104, 1106, 1108, can cause modification of a layout of a graphical interface displayed by the modular device core 1102. In addition, each of the mounting housings 1104, 1106, 1108 may include one or more additional function devices (e.g., additional function device 132 of FIG. 1) that can be used by the modular device core 1102 when mounted into the respective mount. For example, as described, utilization of the additional function device 132 can be facilitated by modular device core 1102 detecting engagement of certain electrical contacts on a housing of modular device core 1102, and accordingly communicating instructions for utilizing the additional function device via the electrical contacts. In another example, utilization of the additional function device can be facilitated by modular device core 1102 receiving one or more instructions or parameters from an interface of given mounting housings 1104, 1106, 1108 related to using the additional function device, which may be based on detecting engagement of certain electrical contacts or other interfaces on a housing of modular device core 1102 to the mounting housings 1104, 1106, 1108. In this example, modular device core 1102 can receive the instructions or parameters and accordingly utilize the additional function device.

Specifically, in the example of FIG. 11, mounting housings 1104 can be a bicycle mount that mounts to a handlebar 1103 or other frame component of a bicycle and includes additional function device 132 in the form of GPS navigation and/or speed tracking that can be used by the modular device core 1102 (e.g., to obtain and display directional and/or speed data) when mounted in mounting housing 1104. Mounting housing 1106 can be a hiking strap that provides an altimeter, GPS radio, additional batteries, etc. that can be used by the modular device core 1102 (e.g., to obtain and display a direction and/or a compass, location, altitude, number of steps, etc., power the modular device core 1102 or charge batteries thereof, etc.) when mounted in mounting housing 1106. Mounting housing 1108 can be a fitness strap mount that provides a communication link to gym equipment that can be used by the modular device core 1102 (e.g., to obtain and display a pulse rate from the gym equipment, a time, etc.) when mounted in mounting housing 1108, though in another example, mounting housing 1108 and/or modular device core 1102 may be configured to obtain and display this data using corresponding sensors on the mounting housing 1108 and/or modular device core 1102. In any case, additional functional features can be added to the modular device core 1102 depending on the mount, which can enable new uses specific to a sport or other activity.

Figure 12:
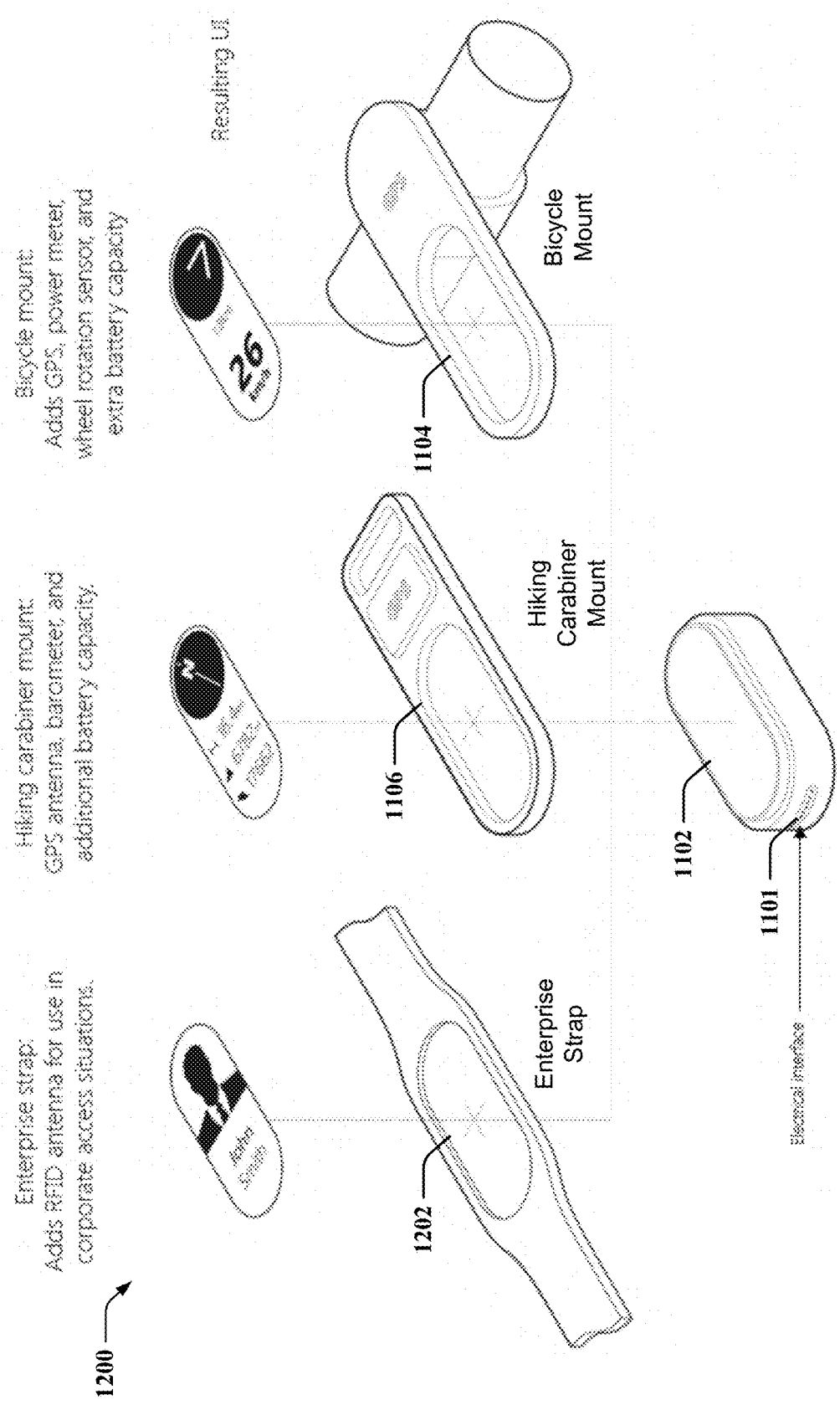
FIG. 12 is a perspective view of example straps, wrist bands, or other mounts attachable to an example modular device core in accordance with aspects described herein.

Further examples of user interfaces 1200 for display with respect to modular components 1100 are shown in FIG. 12, which illustrates modular device core 1102 having an electrical interface 1101 for coupling the modular device core 1102 to one or more mounting housings 1104, 1106, or strap 1202 (which can include a mounting housing). As described, for example, coupling the modular device core 1102 to the mounting housings 1104, 1106, or strap 1202 can cause the modular device core 1102 to display different user interfaces 1200, where one or more parameters from which the modular device core 1102 can determine the appropriate user interface 1200 can be communicated from the mounting housing 1104, 1106, and/or strap 1202 to modular device core 1102 via electrical interface 1101 (which can be similar to communications interface 114), and/or an associated electrical interface (not shown) in mounting housing 1104, 1106, and/or strap 1202. Additionally, modular device core 1102 can utilize one or more additional functions in the mounting housing 1104 (e.g., GPS antenna, barometer, additional battery, etc.), mounting housing 1106 (e.g., GPS, power meter, wheel rotation sensor, additional batter, etc.), or strap 1202 (e.g., RFID antenna, etc.) via electrical interface 1101 connecting with an interface of the mounting housing 1104, 1106, or strap 1202. As described, in an example, modular device core 1102 can include or receive instructions for using the additional functions of the mounting housing 1104, 1106, or strap 1202 via electrical interface 1101.

Figure 13:
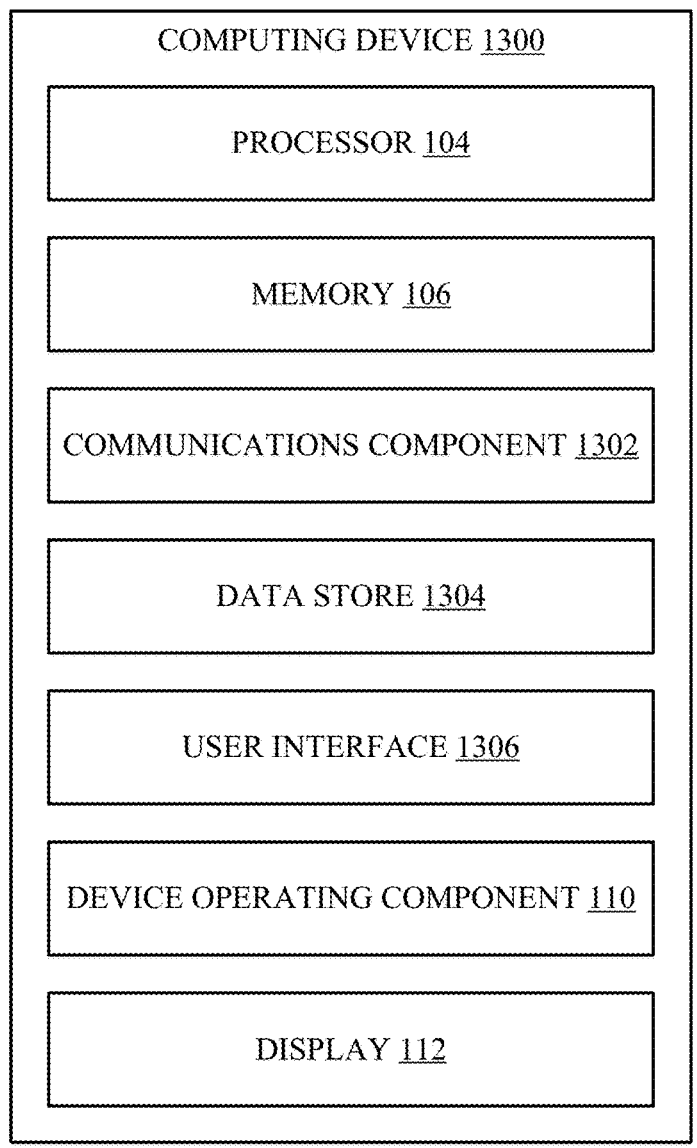
FIG. 13 is a schematic diagram of an example of a computing device in accordance with aspects described herein.

FIG. 13 illustrates an example of computing device 1300 that may be included in modular device core 100. In one aspect, computing device 1300 may include processor 104, as described in FIG. 1, for carrying out processing functions associated with one or more components and functions described herein. Processor 104 can include a single or multiple set of processors or multi-core processors. Moreover, processor 104 can be implemented as an integrated processing system and/or a distributed processing system.

Computing device 1300 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute device operating component 110 and/or other components of the computing device 1300.

Further, computing device 1300 may include a communications component 1302 that provides for establishing and maintaining communications with one or more other devices, parties, entities, etc. utilizing hardware, software, and services as described herein. Communications component 1302 may carry communications between components on computing device 1300, as well as between computing device 1300 and external devices, such as one or more mounting housing 102, devices located remotely from computing device 1300 (e.g., one or more mobile devices) and/or devices serially or locally connected to computing device 1300. For example, communications component 1302 may include one or more buses, and may further include transmit chain components and receive chain components associated with a wireless or wired transmitter and receiver, respectively, operable for interfacing with external devices.

Additionally, computing device 1300 may include a data store 1304, which can be any suitable combination of hardware and/or software, that provides for mass storage of information, databases, and programs employed in connection with aspects described herein. For example, data store 1304 may be or may include a data repository for applications and/or related parameters not currently being executed by processor 104. In addition, data store 1304 may be a data repository for device operating component 110 and/or one or more other components of the computing device 1300.

Computing device 1300 may also include a user interface component 1306 operable to receive inputs from a user of computing device 1300 and further operable to generate outputs for presentation to the user (e.g., via display 112). User interface component 1306 may include one or more input devices, including but not limited to a touch panel on display 112, a keyboard, a number pad, a mouse, a touch-sensitive display, a navigation key, a function key, a microphone, a voice recognition component, a gesture recognition component, any other mechanism capable of receiving an input from a user, or any combination thereof. Further, user interface component 1306 may include one or more output devices, including but not limited to a display interface to display 112, a speaker, a haptic feedback mechanism, a printer, any other mechanism capable of presenting an output to a user, or any combination thereof.

Computing device 1300 may additionally include a device operating component 110, as described, for executing one or more applications on computing device 1300, for modifying one or more device operating parameters, modifying a layout of a graphical interface displayed on display 112, detecting initiation of an interface between computing device 1300 and a mounting housing, communicating with additional function devices in the mounting housing, etc., as described. In addition, processor 104 can execute device operating component 110, and memory 106 or data store 1304 can store related instructions, parameters, etc., as described.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device, comprising:
   a modular device core, including:
   a core retainer;
   a processor mounted in the core retainer;
   an attachment interface included in the core retainer, wherein the attachment interface is configured to releasably attach the core retainer to at least one of a mounting housing or a display module; and
   an interface mounted in the core retainer and in electrical communication with the processor, wherein the interface comprises multiple electrical contacts, and wherein at least a portion of the multiple electrical contacts are engaged by one or more contacts on the at least one of the mounting housing or the display module based on attaching the core retainer to at least one of the mounting housing or the display module; and a display attached to at least one of the core retainer or the display module, wherein the processor is configured to determine, based on detecting which of the multiple electrical contacts are engaged by the one or more contacts, a mounting orientation of the modular device core as one of a plurality of different mounting orientations within the mounting housing, and wherein the processor is configured to modify one or more parameters for operating the modular device core based on the determined mounting orientation, wherein at least one of the one or more parameters relate to a layout of a graphical interface displayed on the display.

2. The device of claim 1, wherein the one or more parameters relate to one or more fields included in the layout.

3. The device of claim 1, wherein the one or more parameters relate to an orientation of the layout.

4. The device of claim 1, wherein the processor is configured to determine, based at least in part on the detecting which of the multiple electrical contacts are engaged by the one or more contacts, one or more additional functions provided by the mounting housing, wherein the one or more parameters relate to the one or more additional functions.

5. The device of claim 4, wherein the one or more additional functions relate to a global positioning system (GPS) function provided by a GPS radio included in the mounting housing, and wherein the one or more parameters relate to the layout for displaying, via the display, one or more data fields related to use of the GPS radio.

6. The device of claim 4, wherein the one or more additional functions relate to a fitness tracking function provided by a fitness tracking device included in the mounting housing, and wherein the one or more parameters relate to the layout for displaying, via the display, one or more data fields related to use of the fitness tracking device.

7. The device of claim 4, wherein the processor is configured to:
receive, via the detecting the portion of the multiple electrical contacts, information related to an application programming interface (API) for utilizing the one or more additional functions of the mounting housing; and
utilize the API for using the one or more additional functions.

8. The device of claim 1, wherein the processor is configured to receive a configuration indicating a mapping between at least one property of the portion of the multiple electrical contacts and the one or more parameters, and wherein the processor is configured to detect at least one property of the one or more signals and determine the one or more parameters based at least in part on the mapping.

9. The device of claim 1, further comprising the mounting housing having a second attachment interface and housing a second communication interface, wherein the second attachment interface is configured to releasably fix the attachment interface of the modular device core to the mounting housing, and wherein the second communication interface is configured to communicatively couple to the interface of the modular device core.

10. The device of claim 1, wherein the core retainer attaches to an aperture or recess defined by at least one of the mounting housing or the display module.

11. A device, comprising:
a housing having an attachment interface configured to releasably fix to a modular device core; and
a communication interface for providing one or more signals to the modular device core based on attaching the modular device core to the mounting housing in one of a plurality of different mounting positions, wherein the communication interface comprises multiple electrical contacts, and wherein at least a portion of the multiple electrical contacts are engaged by one or more contacts on the modular device,
wherein the one or more signals comprise one or more parameters for operating the modular device core based on detecting which of the multiple electrical contacts are engaged by the one or more contacts on the modular device, wherein at least one of the one or more parameters relate to a layout of a graphical interface to be displayed on a display of the modular device core.

12. The device of claim 11, wherein the housing provides the plurality of mounting positions for receiving the modular device core in a defined aperture or recess, and wherein the one or more signals indicate one of the plurality of mounting positions of the modular device core.

13. The device of claim 11, further comprising a processor for detecting, via an interface, mounting of the modular device core, wherein the processor is configured to indicate one or more additional functions of the mounting housing by communicating one or more signals to the modular device core over the interface.

14. The device of claim 13, further comprising a global positioning system (GPS) radio for providing a GPS function to the modular device core via the interface when the modular device core is mounted to the mounting housing, wherein the processor is configured to communicate information related to an application programming interface (API) for using the GPS radio over the interface, and wherein the one or more parameters relate to the layout for displaying, via the display, one or more data fields related to the GPS radio.

15. The device of claim 13, further comprising a fitness tracking device for providing a fitness tracking function to the modular device core via the interface when the modular device core is mounted to the mounting housing, wherein the processor is configured to communicate information related to an application programming interface (API) for using the fitness tracking device over the interface, and wherein the one or more parameters relate to the layout for displaying, via the display, one or more data fields related to the fitness tracking device.

16. The device of claim 13, further comprising at least one of an accelerometer, a gyro sensor, an angle or orientation sensor, a compass, or a battery, wherein the processor is configured to communicate information related to an application programming interface (API) for using the accelerometer, the gyro sensor, the angle or orientation sensor, the compass, or the battery over the interface, and wherein the one or more parameters relate to the layout for displaying, via the display, one or more data fields related to at least one of the accelerometer, the gyro sensor, the angle or orientation sensor, the compass, or the battery.

17. The device of claim 11, further comprising the modular device core having a second attachment interface and a second communication interface, wherein the second attachment interface is configured to releasably fix the attachment interface of the device to the modular device core, and wherein the second communication interface is configured to communicatively couple to the communication interface of the device.

18. A method for operating a modular device core, comprising:
  detecting, by a processor, which of multiple electrical contacts on the modular device core are engaged by one or more contacts on the at least one of a mounting housing or a display module; and
  modifying one or more parameters for operating the modular device core based at least in part on detecting which of the multiple electrical contacts are engaged by the one or more contacts,
  wherein the one or more parameters relate to a layout of data fields on a graphical interface displayed on a display based at least in part on the one or more signals.

19. The method of claim 18, further comprising determining, based at least in part on the detecting which of the multiple electrical contacts are engaged by the one or more contacts, one or more additional functions provided by the mounting housing or display module, wherein the one or more parameters relate to the one or more additional functions.

20. The method of claim 19, wherein the one or more additional functions relate to a global positioning system (GPS) function provided by a GPS radio included in the mounting housing, and wherein the one or more parameters relate to the layout for displaying, via the display module, one or more data fields related to use of the GPS radio.

* * * * *